Patented Oct. 10, 1939

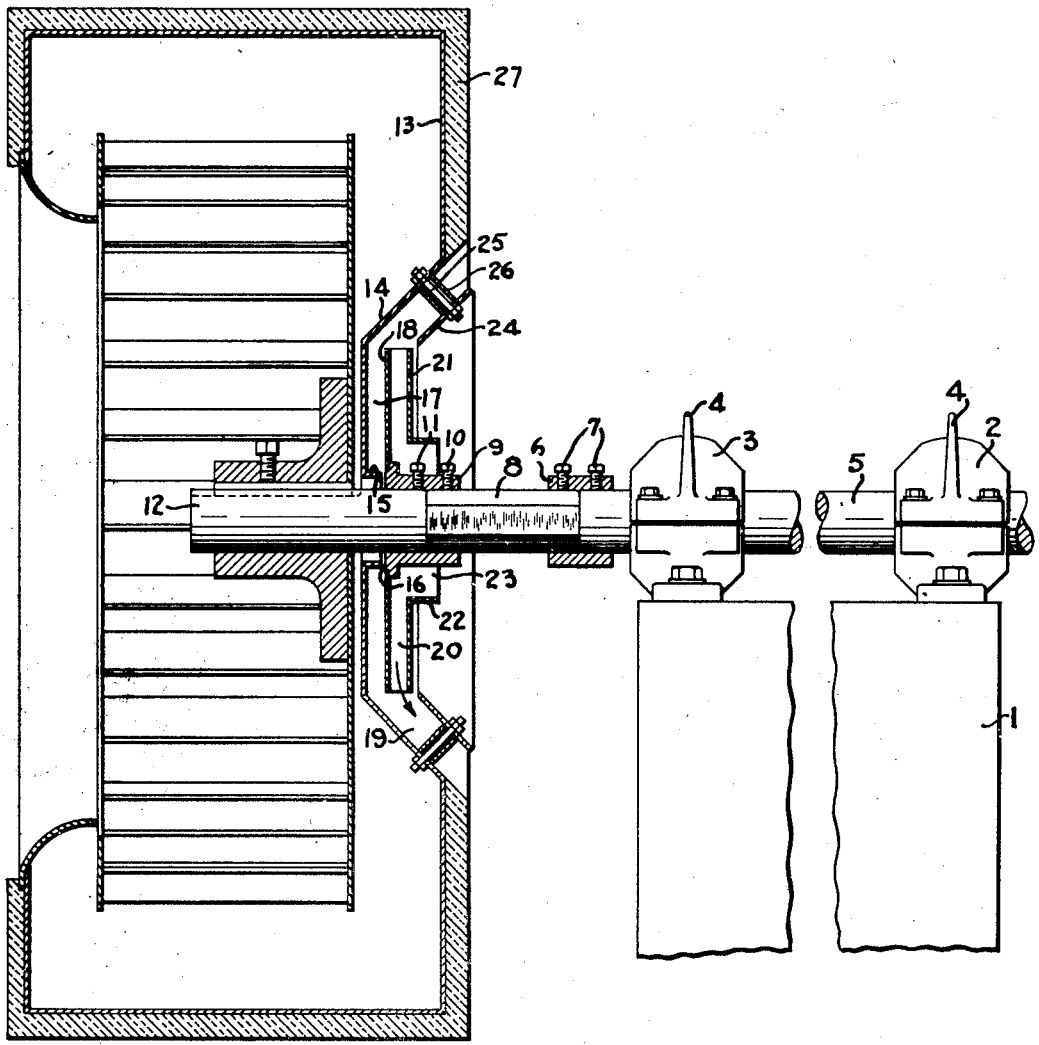

2,175,470

UNITED STATES PATENT OFFICE 2,175,470

METHOD AND APPARATUS FOR COOLING BEARINGS

Murray S. Kice, Jr., Birmingham, Mich., assignor to American Blower Corporation, Detroit, Mich., a corporation of Delaware Application January 23, 1937, Serial No. 121,934

11 Claims. (Cl. 230—209)

My invention relates to a method and apparatus for cooling a bearing.

It is the object of my invention to provide a means and method of cooling a bearing and a connected shaft and any driving mechanism such as a motor connected therewith where the associated mechanism is subjected to high temperatures. For instance, in the case of a fan handling high temperature gases, it is desirable to reduce the temperature of the drive shaft of the fan and associated parts or to prevent the transmission of the temperature so as not to affect the bearings supporting the driving shafts or affect the motor driving the shaft.

It is a further object to prevent the escape of the hot gases, and in the event the gases are dust laden, to prevent the escape of the dust to a point exterior of the fan where the dust may injure the bearings or the hot air may increase the temperature of the bearings, the driving motor and the like.

It is a further object to provide a means for preventing the transmission of such heat, means for cooling the associated parts that would transmit the heat, and means for providing a seal between the interior of the fan and the exterior thereof, which seal may be closely adjusted.

The drawing shows a sectional view, partly in elevation, of the improved fan structure.

It will be understood, in illustrating the construction, that the intermediate shaft may be omitted, when desired, and a direct connection made between the fan shaft and the driving shaft, or an air gap may be left therebetween within the coupling connecting the shafts.

Referring to the drawing in detail, 1 is an independent bearing pedestal having mounted thereon the bearings 2 and 3 which are provided with heat radiating fins 4. The number and arrangement of these fins are optional and they may be omitted entirely. For the purpose of simplicity in the drawing, the fins have only been illustrated to the extent of one fin per bearing.

These bearings support a driving shaft 5 which is connected to a suitable driving motor or other source of motive power.

The inner end of the shaft 5 is connected by a collar 6 and set screws 7 to an intermediate shaft 8 that may either be round or angular in section. This intermediate shaft 8 is preferably made from a piece of stainless steel or other material that has a very low heat conductivity factor. The other end of this intermediate shaft 8 is connected in the hub 9 by the set screws 10 and 11 to the fan shaft 12. This fan shaft supports and drives a main fan rotor of any conventional type within the main fan casing 13. One wall of this main fan casing 13, opposite the wall provided with the main fan inlet, is designated 14 and has adjacent the shaft 12 an outwardly turned flange 15. By reason of the adjustability of hub 9, the hub can be brought closely adjacent to the end 16 of this flange 15 so as to provide a very close seal therebetween to prevent the escape of hot gases and of dust, if the gases being handled are dust laden. Furthermore, any escape of such gases into the passageway 17 between the side wall 14 and the disk 18 of the supplementary cooling fan will not be harmful because they will be induced to flow outwardly on the inside of the side wall 14 through the passageway 17 by the discharge at 19 of air from the fan blades 20 of the supplementary fan.

This supplementary fan consists of a back plate 18 mounted on the hub 9 with a plurality of radial fan blades 20 supporting on their face a plate 21 and an outwardly extending spaced annular collar 22 forming an air inlet passageway 23 for the air, which is drawn in by the action of the fan through the passageway 23 over the blades 20 and discharged at 19. The air thus discharged is discharged between the side wall 14 of the fan casing and the radiation shield 24 which is mounted by bolts 25 and spacer sleeves 26 on the outside of the fan casing. The fan casing is also provided with an insulation cover 27. I propose the use of fan shaft material preferably of an alloy of low thermal conductivity such as a stainless steel, for temperatures above 1000 degrees F.

In the event a continuous shaft is used for supporting the fan rotor and for use as a drive shaft, the side wall 14 is formed into a side cone.

In operation, the temperatures within the fan housing range from 500 to 1600 degrees Fahrenheit, but the heat will be prevented from being transmitted from the shaft 12 and the walls of the casing by the construction heretofore described.

It will be understood that I desire to comprehend within my invention such modifications as may be necessary to adapt it to varying conditions and uses.

Having thus fully described my invention, what I claim as new and desire to secure by Letters Patent, is:

1. In combination, a main fan adapted to handle hot gases, a fan shaft therein projecting outside of the main fan casing, a bearing therefor, a supplementary fan mounted on said shaft having radial blades, an axial air inlet adjacent the bearing and remote peripheral outlets between said blades adapted to discharge air radially outwardly along the outer face of said main fan casing, means on said main fan casing for making a relatively tight seal between said casing and said shaft comprising an outwardly turned flange, and means adjustably mounting said supplementary fan with respect to said flange whereby the minimum clearance therebetween is provided to prevent the leakage of gas therethrough.

2. In combination, a main fan with a rotor and a surrounding casing having a side wall outwardly turned to form a flange surrounding a drive shaft, a fan drive shaft supporting said main fan rotor and extending through said flange, an adjustable abutment on said shaft with respect to the end of said flange to form a substantially tight seal between said casing side wall and said shaft, and a supplementary fan operated by said shaft adjacent said flange.

3. In combination, a main fan with a casing having a side wall outwardly turned to form a flange surrounding a drive shaft, a fan drive shaft, an abutment on said shaft adjustable with respect to the end of said flange to form a substantially tight seal between said casing side wall and said shaft, and a supplementary fan mounted on said abutment adapted to draw air axially over said shaft and discharge it radially outwardly along the outside of the casing from the main fan shaft.

4. In combination, a main fan having a drive shaft and a casing with an inwardly directed side cone forming a portion of a side wall thereof, a supplementary fan mounted on said drive shaft adjacent and outside said side wall and adapted to discharge air radially against a portion of said cone, and a spaced radiation shield mounted on said side cone outside of the periphery of said supplementary fan and forming an extension from an edge thereof whereby the air therefrom is discharged between the radiation shield and the side cone.

5. In combination, a main fan having a drive shaft and a casing having an inwardly directed side cone forming a portion of a side wall thereof, a supplementary fan having an axial inlet and substantially radial blades mounted on the outside of said cone on said drive shaft and adapted to discharge radially against a portion of said cone, a spaced radiation shield mounted on said side cone outside of the periphery of said supplementary fan whereby the air therefrom is discharged between the radiation shield and the side cone, the axial air inlet of said supplemental fan comprising a tubular member mounted on said supplementary fan adjacent the center thereof and adjacent the drive shaft.

6. In combination, a main fan having a fan shaft and a surrounding casing with a conical side wall and an outwardly turned flange surrounding but spaced from said fan shaft, a hub mounted on said fan shaft adjacent the edge of said flange, a supplementary fan mounted thereon for rotation therewith and comprising a back plate, a front plate spaced at its inner margin from said shaft and fan blades connecting said front and back plate, and a stationary annular radiation shield mounted on said main fan side wall beyond the periphery of the supplementary fan and with its inner edge in substantial abutment with the peripheral edge of the front plate of said supplemental fan.

7. In combination, a main fan casing having a laterally-extending sleeve extending about a shaft opening in the side of the casing, a main fan in said casing and a main fan shaft projecting through said opening in the wall of the main fan casing, an adjustable secondary cooling fan mounted on the outside of said casing adjacent to said sleeve, a spaced shield mounted on the main casing in spaced relationship thereto adjacent the periphery of the secondary fan for guiding the air therefrom between it and the outside of the main casing, means on said secondary fan for drawing air along said shaft before deflecting it radially and peripherally over the casing, and an adjustable hub on said shaft for said secondary fan adapted to be brought closely adjacent to said sleeve surrounding the shaft mounted on one wall of the casing to restrict leakage of air from the interior of the casing around the shaft.

8. In combination, a main fan casing having a laterally-extending sleeve extending about a shaft opening in the side of the casing, a main fan in said casing and a main fan shaft projecting through said opening in the wall of the main fan casing, an adjustable secondary cooling fan mounted on the outside of said casing adjacent to said sleeve, said secondary fan having a hub, a shield mounted on the main casing in spaced relationship to said casing and adjacent the periphery of the secondary fan for guiding the air therefrom between it and the outside of the main casing, means on said secondary fan for drawing air along said shaft before deflecting it radially and peripherally over the casing.

9. In combination, a main fan casing having a main fan therein and a shaft passing therethrough, said casing having a sleeve extending around said shaft outwardly, a secondary fan having an adjustable hub mounted on said shaft and substantially abutting said sleeve to form a heat seal, whereby the passage of gases through said main casing is restricted.

10. In combination, a fan casing having a sleeve extending laterally around a fan shaft a main fan in said casing and mounted on a fan shaft projecting through said casing, a secondary fan positioned external to said casing, said secondary fan having means including an adjustable hub mounted on said shaft closely adjacent the end of said sleeve for restricting the passage of gases through the casing between the end of the sleeve and the face of the hub.

11. In combination, a main fan casing having a laterally-extending sleeve extending about a shaft opening in the side of the casing, a main fan in said casing and a main fan shaft projecting through said opening to the exterior of said casing, a secondary cooling fan mounted on a hub which is adjustably secured to the projecting portion of said fan shaft, said hub being mounted adjacent the edge of the sleeve and being adapted substantially to abut said sleeve in order to provide a seal at the hub.

MURRAY S. KICE, Jr.